_Patented Aug. 17, 1954_

2,686,772

UNITED STATES PATENT OFFICE 2,686,772

N,N-ETHYLENEUREIDO ESTERS OF ACRYLIC AND METHACRYLIC ACIDS

Newman M. Bortnick, Oreland, Pa., assignor to Rohm & Haas Company, Philadelphia, Pa., a corporation of Delaware No Drawing. Application April 10, 1953,
Serial No. 348,101

12 Claims. (Cl. 260—77.5)

The invention relates to polymerizable compounds having the general formula

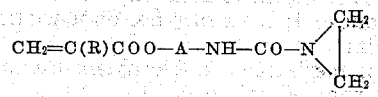

in which R represents a hydrogen atom or a methyl group, and A represents an alkylene group; i. e., a saturated, divalent, aliphatic hydrocarbon group. This invention also relates to the homopolymers of these compounds and to copolymers of the compounds and other copolymerizable compounds which contain at least one vinylidene group, $CH_2=<$.

The compounds of this invention are prepared by reacting ethyleneimine with an isocyanato ester of acrylic or methacrylic acid according to the following representation

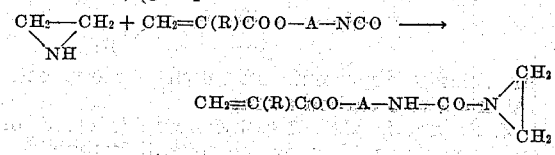

in which the characters, R and A, have the significance described above.

The isocyanato esters which are employed herein are themselves the subject of another of my applications for Letters Patent, Serial No. 319,603, filed November 8, 1952.

It is to be noted that the alkylene groups, which are represented by the character A above, remain intact during the reaction. Compounds in which the alkylene group, A, contains two to fourteen carbon atoms in straight or branched chains are prepared in this way from the corresponding isocyanato esters. The products which have been most satisfactory, however, from the standpoint of ease of polymerization and copolymerization and which have been most useful are those in which A represents the following groups:

The above reaction is carried out at a temperature from about 0° C. to about 50° C.; but it is preferred to employ temperatures from about 0° C. to about 20° C., i. e., room temperature or lower. The reaction is exothermic and care must ordinarily be taken to prevent the temperature from rising above 50° C. where polymerization takes place. It is advisable to use an inert solvent in order to moderate the reaction and for this purpose a hydrocarbon solvent such as benzene, toluene, xylene, pentane and the like is recommended.

The compounds of this invention undergo addition polymerization alone and with other compounds containing a vinylidene group, $CH_2=<$. Such polymerization can be carried out in bulk or in solution or in emulsion. Emulsions of copolymers are particularly valuable for use in the shrink-proofing of wool.

Examples of copolymerizable materials which give rise to thermoplastic copolymers with the products of this invention include the following: N-dialkyl acrylamides such as dimethyl acrylamide and diethyl acrylamide; esters of acrylic, α-chloroacrylic and methacrylic acids such as methyl acrylate, ethyl acrylate, 2-ethylhexyl acrylate, methyl methacrylate, tert.-butyl methacrylate, octyl methacrylates, butyl chloroacrylates and lauryl chloroacrylate; vinyl hydrocarbons such as styrene, α-methylstyrene, vinylnapthalene and vinyltoluene; vinyl chloride and vinylidene chloride; allyl and methallyl esters of saturated aliphatic carboxylic acids such as allyl acetate and methallyl propionate; acrylonitrile; vinylpyridine and the like.

It should also be pointed out that the products of this invention are also copolymerizable with compounds like divinylbenzene, trivinylbenzene and diallyl phthalate, which contain a plurality of vinylidene groups but that the resultant copolymers are cross-linked and consequently non-thermoplastic.

The compounds of this invention can be copolymerized in all proportions with the materials noted above; and the particular ratio of comonomers chosen depends upon the desired end-use of the copolymer. At present it appears that at least 1%, on a molar basis, and preferably from about 2% to about 20%, of a ureido ester of this invention should be used in the preparation of copolymers inasmuch as such ratios assure the presence of a plurality of the reactive ureido groups in each macromolecule of the final copolymer.

Polymerization and copolymerization of the esters of this invention are both accelerated by the use of heat, ultraviolet light and free-radical catalysts. The following are typical of suitable catalysts: α,α'-bis-azoisobutyronitrile, methyl azoisobutyrate, benzoyl peroxide, acetyl peroxide, lauroyl peroxide, tert.-butyl hydroperoxide, di-tert.-butyl peroxide, tert.-butyl perbenzoate, stearoyl peroxide, ascaridol, cumene hydroperoxide, and "per salts" such as ammonium persulfate and ammonium perborate. The catalysts are used in amounts from 0.01% to 5%, and preferably from 0.02% to 2%, based on the weight of the polymerizable compounds.

The following example is presented as embodying the preferred process for making the new N,N-ethyleneureido esters of this invention.

Example 1

Into a three-necked flask equipped with thermometer, mechanical stirrer and reflux condenser was charged a solution of 77.5 parts (0.5 mol) of beta-isocyanatoethyl methacrylate in 1000 parts of pentane. To the stirred solution was added slowly 21.5 parts (0.5 mol) of ethyleneimine while the temperature was maintained between 10° C. and 20° C. by means of external cooling. The reaction mixture was stirred for an hour after the addition of the ethyleneimine. An oily layer separated. The pentane was pumped off at 0°–15° C. under reduced pressure. A 94% yield of N,N-ethyleneureidoethyl methacrylate was thus obtained and its structure was confirmed by analysis.

The product polymerizes very readily, especially at temperatures above 50° C., even in the absence of a peroxidic catalyst. Such polymers are insoluble in most common solvents and merely swell on immersion in methanol or ethanol.

The other esters of this invention are prepared in the same way. Temperature is a most important factor and it is recommended that the temperature be held below about 20° C. in order to avoid loss of the monomeric esters by polymerization.

The following example is presented in order to illustrate the preparation and use of copolymers containing the compounds of this invention.

Example 2

The following components were placed in a 500 ml. flask equipped with a mechanical agitator and thermometer:

97 parts of ethyl acrylate
3 parts of N,N-ethyleneureidoethyl methacrylate

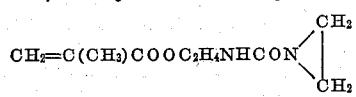

288 parts of water
8.6 parts of non-ionic dispersing agent (a 70% aqueous solution of a tert.-octylphenoxypolyethoxyethanol)

The contents of the flask was cooled to 15° C. and then was added an aqueous solution containing 0.12 part of ammonium persulfate and 0.16 part of sodium hydrosulfite. The mixture was agitated. After about 7 minutes, an exothermic polymerization reaction began and the temperature rose to 47° C. at which point an ice-bath was applied in order to maintain the temperature between 42° and 45° C. In 8 minutes the reaction subsided but agitation was continued until the emulsion cooled to room temperature. When the emulsion was flowed on a glass or metal panel and dried at 100° C., it gave a film which had excellent resistance to toluene and water. A determination of the amount of nitrogen in the film showed that the ethyl acrylate and the N,N-ethyleneureidoethyl methacrylate had copolymerized in the ratio of 97% of the former to 3% of the latter.

The same procedure was followed in the production of an emulsion containing a copolymer of 95% ethyl acrylate and 5% N,N-ethyleneureidoethyl methacrylate. A film laid down from this emulsion was even more resistant to toluene than the one described first.

In a similar way a mixture containing 95% by weight of butyl acrylate and 5% N,N-ethyleneureidoethyl methacrylate was emulsified and polymerized. Still another emulsified copolymer of 95% 2-ethylhexyl acrylate and 5% N,N-ethyleneureidoethyl methacrylate was prepared in a similar fashion.

All of these emulsions had real value in the shrink-proofing of wool when they were padded on woolen fabric and heated to a temperature of 240° F. or higher. The copolymer of butyl acrylate had less harshening effect on the wool than did the copolymers of ethyl acrylate, while the copolymer of 2-ethylhexyl acrylate did not perceptibly alter the hand. In standard comparative wash tests, wool treated with the emulsions described above and heated for 10 minutes at 300° F. shrank less than 5% after a 300 minute laundering while untreated woolen blanks invariably shrank to about one-half their original dimensions.

I claim:

1. Polymerizable N,N-ethyleneureido esters having the general formula

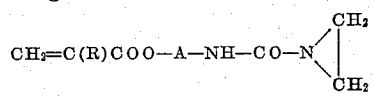

in which R is a member of the class consisting of a hydrogen atom and a methyl group and A represents an alkylene group containing 2 to 14 carbon atoms.

2. Polymerizable N,N-ethyleneureido esters of acrylic acid having the general formula

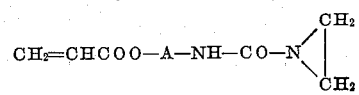

in which A represents an alkylene group containing 2 to 3 carbon atoms.

3. Polymerizable N,N-ethyleneureido esters of methacrylic acid having the general formula

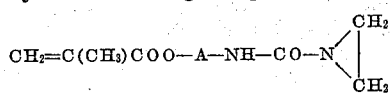

in which A represents an alkylene group containing 2 to 3 carbon atoms.

4. N,N-ethyleneureidoethyl acrylate having the formula

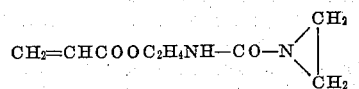

5. N,N-ethyleneureidoethyl methacrylate having the formula

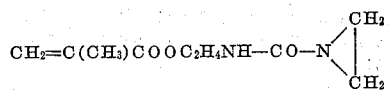

6. A polymer of an N,N-ethyleneureido ester which has the general formula

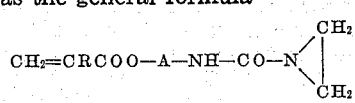

in which R is a member of the class consisting of a hydrogen atom and a methyl group and A represents an alkylene group containing 2 to 14 carbon atoms.

7. A copolymer containing (a) at least 1%, on a molar basis, of a copolymerized N,N-ethyleneureido ester having the general formula

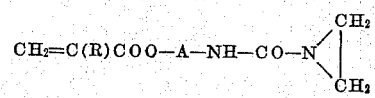

in which R is a member of the class consisting of a hydrogen atom and a methyl group and A represents an alkylene group containing 2 to 14 carbon atoms and (b) at most 99% of a copolymerized compound which is different from said N,N-ethyleneureido ester and which contains a vinylidene group, $CH_2=C<$.

8. A copolymer containing (a) 2% to 20%, on a molar basis, of copolymerized N,N-ethyleneureidoethyl acrylate and (b) 98% to 80% of copolymerized ethyl acrylate.

9. A copolymer containing (a) 2% to 20%, on a molar basis, of copolymerized N,N-ethyleneureidoethyl methacrylate and (b) 98% to 80% of copolymerized ethyl acrylate.

10. A copolymer containing (a) 2% to 20%, on a molar basis, of copolymerized N,N-ethyleneureidoethyl acrylate and (b) 98% to 80% of butyl acrylate.

11. A copolymer containing (a) 2% to 20%, on a molar basis, of copolymerized N,N-ethyleneureidoethyl methacrylate and (b) 98% to 80% of butyl acrylate.

12. A copolymer containing (a) 2% to 20%, on a molar basis, of copolymerized N,N-ethyleneureidoethyl methacrylate and (b) 98% to 80% of octyl acrylate.

No references cited.